(12) United States Patent
Charles et al.

(10) Patent No.: US 12,510,297 B2
(45) Date of Patent: Dec. 30, 2025

(54) LOAD LOCK SYSTEM AND METHOD FOR MANUFACTURING METAL ALLOYS AND METAL POWDER

(71) Applicant: Continuum Powders Corporation, Cloverdale, CA (US)

(72) Inventors: Matthew Charles, Cloverdale, CA (US); Christopher Paul Eonta, Los Gatos, CA (US); Paul Meese, Healdsburg, CA (US); Jonathan Nuttall, Santa Rosa, CA (US)

(73) Assignee: Continuum Powders Corporation, Cloverdale, CA (US)

( * ) Notice: Subject to any disclaimer, the term of this patent is extended or adjusted under 35 U.S.C. 154(b) by 417 days.

(21) Appl. No.: 18/128,438

(22) Filed: Mar. 30, 2023

(65) Prior Publication Data

US 2023/0235959 A1    Jul. 27, 2023

Related U.S. Application Data

(63) Continuation-in-part of application No. 17/516,776, filed on Nov. 2, 2021, now Pat. No. 12,259,185.

(51) Int. Cl.
*F27B 3/22* (2006.01)
*B22F 9/08* (2006.01)
(Continued)

(52) U.S. Cl.
CPC ............... *F27B 3/22* (2013.01); *B22F 9/082* (2013.01); *F27B 3/18* (2013.01); *F27B 3/19* (2013.01);
(Continued)

(58) Field of Classification Search
CPC ...... F27B 3/22; F27B 3/18; F27B 3/19; F27B 3/28; B22F 9/082; B22F 2009/0844;
(Continued)

(56) References Cited

U.S. PATENT DOCUMENTS

| | | | | |
|---|---|---|---|---|
| 3,165,396 A | * | 1/1965 | Goon | B22F 9/12 |
| | | | | 75/367 |
| 4,469,313 A | * | 9/1984 | Ichidate | B22F 9/082 |
| | | | | 425/7 |

(Continued)

FOREIGN PATENT DOCUMENTS

| | | | | | |
|---|---|---|---|---|---|
| CN | 109304471 | * | 2/2019 | ............. | B22F 9/082 |
| CN | 110893468 | * | 3/2020 | ............. | B22F 9/082 |
| JP | S6425907 | * | 1/1989 | ............. | B22F 9/082 |

OTHER PUBLICATIONS

CN109304471, A plasma atomization powder making equipment suitable for high melting point metals, Chen et al., Feb. 5, 2019 (Year: 2019).*

(Continued)

*Primary Examiner* — Jessee R Roe
*Assistant Examiner* — Michael Aboagye
(74) *Attorney, Agent, or Firm* — Stephen A. Gratton

(57) ABSTRACT

A load lock system for manufacturing a metal alloy using a feed material includes a process chamber having a controlled atmosphere, a feed chamber in flow communication with the process chamber having controlled atmosphere capabilities configured to contain a quantity of the feed material, and a collection chamber in flow communication with the process chamber having controlled atmosphere capabilities configured to collect the metal alloy manufactured in the process chamber. The system also includes a gate valve between the process chamber and the feed chamber configured to either allow passage of the feed material between the chambers, or to seal the process chamber from the feed chamber. The system also includes a discharge valve between the process chamber and the collection cham- (Continued)

ber configured to either allow passage of the metal alloy between the chambers, or to seal the process chamber from the collection chamber.

10 Claims, 7 Drawing Sheets

(51) Int. Cl.
   *F27B 3/18* (2006.01)
   *F27B 3/19* (2006.01)
   *F27B 3/28* (2006.01)

(52) U.S. Cl.
   CPC ........ *F27B 3/28* (2013.01); *B22F 2009/0844* (2013.01); *B22F 2009/0848* (2013.01); *B22F 2009/0896* (2013.01)

(58) Field of Classification Search
   CPC ...... B22F 2009/0848; B22F 2009/0896; B22F 2009/0888; B33Y 70/00; F27D 19/00
   USPC ........................................ 266/200, 202, 207
   See application file for complete search history.

(56) References Cited

U.S. PATENT DOCUMENTS

| | | | |
|---|---|---|---|
| 5,396,919 | A | 3/1995 | Wilson |
| 5,516,354 | A * | 5/1996 | Miller .................... B22F 9/082 |
| | | | 75/338 |
| 9,925,591 | B2 | 3/2018 | Eonta et al. |
| 9,937,436 | B2 * | 4/2018 | Dohnomae ............ B01D 5/006 |
| 10,654,106 | B2 | 5/2020 | Eonta et al. |
| 11,235,389 | B2 | 2/2022 | LaTour et al. |
| 11,590,574 | B2 | 2/2023 | LaTour et al. |
| 11,623,278 | B2 | 4/2023 | Eonta et al. |
| 11,680,749 | B2 * | 6/2023 | Huang .................... F27B 3/18 |
| | | | 373/79 |
| 12,259,185 | B2 | 3/2025 | Meese et al. |
| 2007/0029517 | A1 | 2/2007 | Lenihan |
| 2020/0086390 | A1 | 3/2020 | LaTour et al. |
| 2020/0189000 | A1 | 6/2020 | LaTour et al. |
| 2021/0008621 | A1 | 1/2021 | Eonta et al. |
| 2022/0136769 | A1 | 5/2022 | Meese et al. |

OTHER PUBLICATIONS

CN110893468 A Method And Device For Combined Atomizing For Preparing Spherical Metal Powder, Mar. 20, 2020 (Year: 2020).*
JPS6425907, Tsuchiya, Jan. 27, 1989 (Year: 1989).*

* cited by examiner

```
┌─────────────────────────────────────────────────────────────────────┐
│  Providing a process chamber 16 having a first controlled atmosphere 18 │
│  configured to perform a melting and atomization process, providing a feed │
│   chamber 20 in flow communication with the process chamber 16 having   │
│  controlled atmosphere capabilities configured to store a quantity of the feed │
│  material 14 for transport into the process chamber 16, and providing a collection │
│     chamber 22 in flow communication with the process chamber 16 having    │
│    controlled atmosphere capabilities configured to collect the metal powder 12 │
│                  manufactured in the process chamber 16                 │
└─────────────────────────────────────────────────────────────────────┘
                                    │
                                    ▼
┌─────────────────────────────────────────────────────────────────────┐
│   Providing a gate valve 24 between the process chamber 16 and the feed │
│  chamber 20 and a discharge valve 26 between the process chamber 16 and │
│   the collection chamber 22 configured to selectively seal (close) or unseal │
│                      (open) the process chamber 16                      │
└─────────────────────────────────────────────────────────────────────┘
                                    │
                                    ▼
┌─────────────────────────────────────────────────────────────────────┐
│  Forming a second controlled atmosphere 18FC in the feed chamber 20 and │
│    forming a third controlled atmosphere 18CC in the collection chamber 22 │
└─────────────────────────────────────────────────────────────────────┘
                                    │
                                    ▼
┌─────────────────────────────────────────────────────────────────────┐
│    Feeding the feed material 14 from the feed chamber 20 through the gate │
│                    valve 24 into the process chamber 18                    │
└─────────────────────────────────────────────────────────────────────┘
                                    │
                                    ▼
┌─────────────────────────────────────────────────────────────────────┐
│  Melting the feed material 14 into a molten metal 44 and atomizing time molten │
│          metal 44 into the metal powder 12 in the process chamber 16         │
└─────────────────────────────────────────────────────────────────────┘
                                    │
                                    ▼
┌─────────────────────────────────────────────────────────────────────┐
│  Discharging the metal powder 12 from the process chamber 16 through the │
│              gate valve 24 into the collection chamber 22              │
└─────────────────────────────────────────────────────────────────────┘
```

FIG. 4

LOAD LOCK SYSTEM AND METHOD FOR MANUFACTURING METAL ALLOYS AND METAL POWDER

CROSS REFERENCE TO RELATED APPLICATION

This application is a continuation-in-part of Ser. No. 17/516,776, filed Nov. 2, 2021, U.S. Pat. No. 12,259,185 B2.

FIELD

This disclosure relates to the manufacture of metal alloys particularly metal powders used in the metal additive manufacturing (AM) industry, such as 3-D printers.

BACKGROUND

Metal powder used in additive manufacturing can be manufactured using a controlled atmosphere metallurgical system having a mixing melting cold hearth system for melting a feed material and an atomization system for forming metal powder in a sealed process chamber. An exemplary metallurgical system is disclosed in U.S. Pat. No. 9,925,591 B2 to Eonta et al., which is incorporated herein by reference. In this type of metallurgical system, the atmosphere of the process chamber must remain constant throughout a heat. At the same time for bulk manufacturing of products, a high throughput must be achieved. Feeders with isolation valves can be used to allow feed materials to be continually loaded into the process chamber without disturbing the processing environment. An exemplary powder feeder system is disclosed in US Publication No. US 2022/013679 A1 to Meese et al., which is incorporated herein by reference.

Limitations on the lot size are dictated by AMS 7002, 3.31, which states "Any interruption that requires opening the powder production vessel (i.e., loss of controlled atmosphere) shall be considered the end of the heat." In prior art systems having isolation valves, the feed materials are typically fed into the process chambers in batches. Similarly, the product materials are typically removed in batches following the end of the heat.

The present disclosure is directed to a load lock system and method for manufacturing a metal powder with a continuous feed delivery process of the feed materials into the process chamber as well as a continuous product removal process of the metal powder from the process chamber without disturbing the controlled environment in the process chamber. In addition, the continuous non-stop feed delivery process and product removal process can be performed without lot size limitations. Further, the system and method are configured to add the feed material and allow removal of the product without interruption of the heat. The present disclosure also discloses a novel valve for metal powder configured as a discharge valve for the load lock system.

SUMMARY

A load lock system for manufacturing a metal alloy using a feed material includes a process chamber having a controlled atmosphere, and a metallurgical system in the process chamber configured to perform a metallurgical process to make the metal alloy. The load lock system also includes a feed chamber in flow communication with the process chamber having controlled atmosphere capabilities configured to contain a quantity of the feed material, and a feed mechanism configured to transport the feed material from the feed chamber into the process chamber. The load lock system also includes a collection chamber in flow communication with the process chamber having controlled atmosphere capabilities configured to collect the metal alloy manufactured in the process chamber by the metallurgical system.

The load lock system also includes a gate valve (or series of gate valves) between the process chamber and the feed chamber configured to either allow passage of the feed material between the chambers, or to seal the process chamber from the feed chamber and preserve the controlled atmosphere in the process chamber. The load lock system also includes a discharge valve (or series of discharge valves) between the process chamber and the collection chamber configured to either allow passage of the metal alloy between the chambers, or to seal the process chamber from the collection chamber to preserve the controlled atmosphere in the process chamber.

In an illustrative embodiment, the metal alloy comprises a metal powder and the metallurgical system comprises a mixing melting cold hearth system for melting the feed material into a molten metal and an atomization system for atomizing the molten metal into the metal powder. The controlled atmosphere in the process chamber can be formed by vacuuming out the process chamber and backfilling with inert or reactive gas or gases. Similarly, controlled atmospheres can be formed in both the feed chamber and the collection chamber using the same techniques. For example, the controlled atmospheres in all of the chambers can have a same atmospheric pressure and gas composition.

A method for manufacturing a metal powder using a feed material includes the steps of: providing a process chamber having a first controlled atmosphere, providing a metallization system in the process chamber configured to perform a melting and atomization process, providing a feed chamber in flow communication with the process chamber having controlled atmosphere capabilities configured to store a quantity of the feed material for transport into the process chamber, and providing a collection chamber in flow communication with the process chamber having controlled atmosphere capabilities configured to collect the metal powder manufactured in the process chamber. The method also includes the step of providing a gate valve between the process chamber and the feed chamber and a discharge valve between the process chamber and the collection chamber configured to selectively seal (close) or unseal (open) the process chamber.

The method also includes the steps of: forming a second controlled atmosphere in the feed chamber and forming a third controlled atmosphere in the collection chamber; feeding the feed material from the feed chamber through the gate valve into the process chamber; melting the feed material into a molten metal and atomizing the molten metal into the metal powder in the process chamber; and discharging the metal powder from the process chamber through the gate valve into the collection chamber. The method can also include the step of sealing the process chamber using the gate valve and loading the feed chamber, and the step of sealing the process chamber using the discharge valve and removing the collection chamber.

A valve for metal powder suitable for use as the discharge valve in the system includes a body having an interior chamber, an inlet opening in flow communication with the interior chamber for collecting the metal powder, and an outlet opening in flow communication with the interior chamber for discharging the metal powder. The valve also includes a rotary actuator mounted to the body and having a rotatable shaft mounted through a vacuum seal into the interior chamber of the body. The valve also includes a sealing plate connected by a pair of metal arms to the rotatable shaft and movable to either seal (close) the inlet opening or to unseal (open) the inlet opening. The sealing plate includes an elastomeric sealing ring on a major surface thereof that mates with a sealing flange on the inlet opening. The actuator can be operated to rotate the shaft in a first direction (e.g., clockwise) and press the sealing ring against a serrated surface of the sealing flange sealing the inlet opening. Alternately, the actuator can be operated to rotate the shaft in a second direction (e.g., counter clockwise) opening the inlet opening and allowing the metal powder to fall downwards by gravity through the interior chamber and through the outlet opening into the collection chamber. The body of the valve can also include a conical portion for funneling the metal powder from the interior chamber through the outlet opening.

BRIEF DESCRIPTION OF THE DRAWINGS

FIG. 4 is a flow diagram illustrating steps in a method for manufacturing a metal powder using the load lock system;

DETAILED DESCRIPTION

Figure 1:
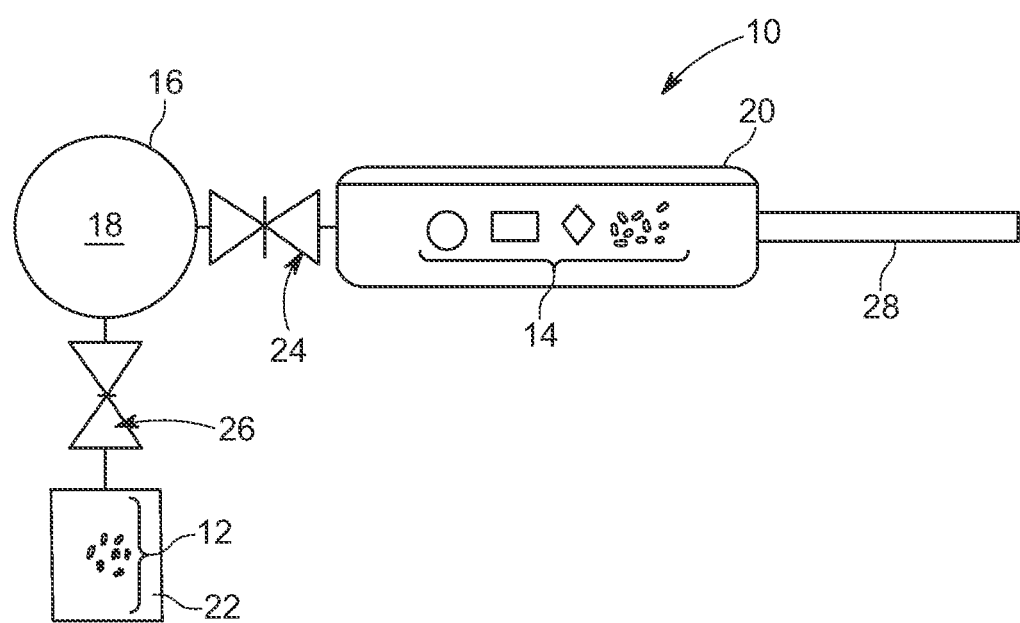
FIG. 1 is a schematic drawing of a load lock system for manufacturing a metal alloy in a process chamber.
Figure 2:
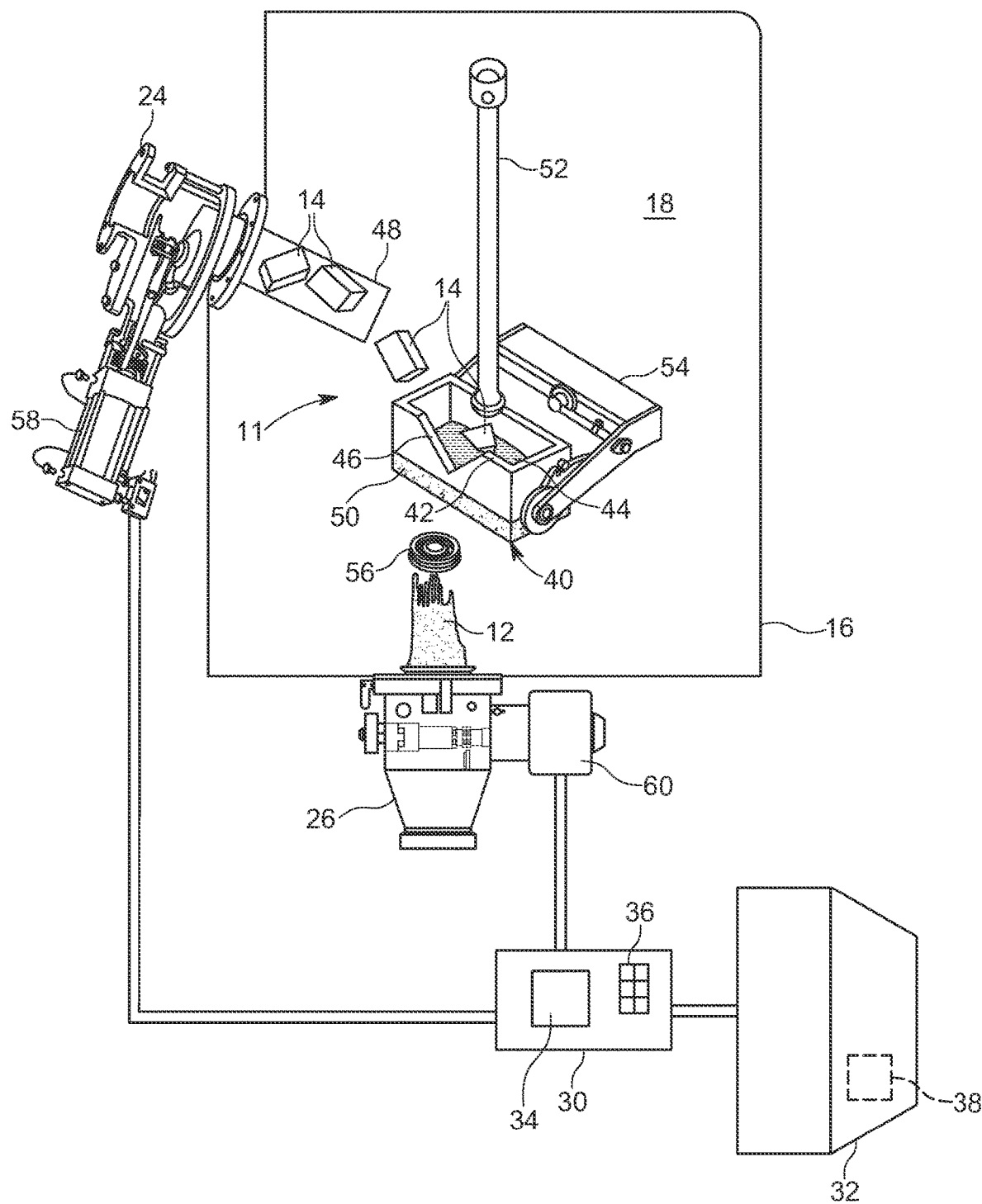
FIG. 2 is a schematic drawing illustrating an exemplary load lock system having a mixing melting cold hearth system and an atomization system in the process chamber for manufacturing a metal powder.

Referring to FIGS. 1 and 2, a load lock system 10 for manufacturing a metal powder 12 using a feed material 14 is illustrated. The load lock system 10 includes a process chamber 16 having a controlled atmosphere 18, a feed chamber 20 in flow communication with the process chamber 16 having controlled atmosphere capabilities configured to hold a quantity of the feed material for transport into the process chamber 16, and a collection chamber 22 in flow communication with the process chamber 16 having controlled atmosphere capabilities configured to collect the metal powder 12 from the process chamber 16. As used herein the term "load lock" means the load, which in this case is the feed material 14, can be placed in the feed chamber 20 with the atmospheric conditions in the process chamber 16 and the feed chamber 20 locked together.

The load lock system 10 also includes a gate valve 24 between the process chamber 16 and the feed chamber 20 configured to selectively seal (close) or unseal (open) the process chamber 16 from the feed chamber 20, and a discharge valve 26 between the process chamber 16 and the collection chamber 22 configured to selectively seal (close) or unseal (open) the process chamber 16 from the collection chamber 22. The feed chamber 20 can also include a feed mechanism 28 configured to transport the feed material 14 through the feed chamber 20 into the process chamber 16. The feed mechanism 28 can include a hydraulic cylinder, pneumatic cylinder, actuator, belt chain, track, conveyor, or other motive device configured to transport the feed material 14 into the process chamber 16.

As shown in FIG. 2, the load lock system 10 can also include a digital readout device 30 in signal communication with a central processing unit (CPU) 32 configured to display data on a screen 34 and a keypad 36 configured to provide information to the central processing unit (CPU) 32 from an operator (not shown). The central processing unit (CPU) 32 can also include one or more automated programs 38 configured to control the gate valve 24 and the discharge valve 26. The central processing unit (CPU) 32 can be configured to control the feed mechanism 28 and to control the atmospheres in the feed chamber 20 and the collection chamber 22. In addition, the central processing unit (CPU) 32 can be configured to control a sequence of feeding, melting, pouring and atomizing in the process chamber 16. The central processing unit (CPU) 32 can comprise an off the shelf component purchased from a commercial manufacturer. The automated programs 38 can include computer code having a set of instructions, or a system of rules, written in a particular programming language (e.g., a source code and an object code). The automated programs 38 can be written using techniques that are known in the art.

As also shown in FIG. 2, the load lock system 10 also includes a metallurgical system 11 in the process chamber comprising a mixing melting cold hearth system 40 having a mixing melting hearth 42 configured to melt the feed material 14 into a molten metal 44. The mixing melting hearth 42 includes a pour notch 46 for pouring the molten metal 44, and a feeder 48, such as a tube, channel, or conveyor, in close proximity to the mixing melting hearth 42, configured to feed the feed material 14 into the mixing melting hearth 42. The mixing melting hearth 42 also includes an induction coil 50 configured to heat the molten metal 44. The mixing melting cold hearth system 40 also includes an external heat source 52, such as a plasma torch system, a plasma transferred arc system, an electric arc system, an induction system, a photon system, or an electron beam energy system in close proximity to the mixing melting hearth 42, which is also configured to heat the molten metal 44. The mixing melting cold hearth system 40 can also include a tilting mechanism 54 as described in U.S. application Ser. No. 17/976,755, to Meese et al., which is incorporated herein by reference. The mixing melting cold hearth system 40 can be configured to form alloys suitable for forming the metal powder 12 and to also form castings of metal alloys. By way of example, the mixing melting cold hearth system 40 can be configured to operate with the controlled atmosphere 18 having a vacuum pressure of from 10 mtorr to a 5 psi positive gage pressure. A gas composition can comprise inert gases having a particular chemical composition and gas ratios.

As also shown in FIG. 2, the load lock system 10 also includes an atomization system 56 in flow communication with the mixing melting hearth 42 configured to receive a stream of the molten metal 44 and form the metal powder 12, which is comprised of particles having a desired particle shape and particle size. U.S. Pat. Nos. 9,925,591 and 10,654, 106, to Eonta et al., which are incorporated herein by reference, describe further details of the mixing melting cold hearth system 40 and the atomization system 56 as well.

As shown in FIG. 1, the feed material 14 can comprise a feedstock having a desired chemical composition and any desired shape (e.g., cylindrical, rectangular, triangular or powder). Exemplary materials for the feed material 14 include steel, stainless steel, copper, aluminum, and titanium. Chemical analysis of the feed material 14 can be performed to predict elements needed for correction of the final composition to the desired alloy. In addition, the feed material 14 can comprise a recycled material. For example, scrap metals can be collected from various sources and analyzed by a handheld XRF. Hazardous components, such as radioactive materials, toxic materials such as asbestos, or metals such as beryllium, cadmium, and mercury pose dangers to personnel and can be removed from the feed material 14 before processing.

Following chemical analysis the feed material 14 can be cut into smaller chunks (e.g., 1-3 inches) using a portable band saw, a plasma cutter, scrap shears, or any other convenient tools for cutting. Following the cutting process, the feed material 14 can be loaded into the feed chamber 20 and transported to the process chamber 16 for the metallurgical processes of melting and atomizing. In one embodiment, melting can be accomplished in two stages. In a first stage electrical current can be passed through the induction coil 50 to melt the feed material 14 in the mixing melting hearth 42. The external heat source 52 can then be used to direct plasma gas and generate an electric arc, heating the feed material 14 to the desired temperature and further melting into the molten metal 44. The mixing melting hearth 42 can then be used to mix the molten metal 44 and provide a uniform composition, with composition correction performed if necessary.

Still referring to FIG. 2, the gate valve 24 can comprise a bulk material handling valve operated by a hydraulic cylinder 58 that is controllable by the digital read out device 30 and the central processing unit (CPU) 32. The gate valve 24 can be selectively placed in an "open" position in which the process chamber 16 and feed chamber 20 are in flow communication for the feed material 14 and atmospheric communication for gases between the chambers as well. Alternately, the gate valve 24 can be placed in a "closed" position in which the process chamber 16 is sealed from material flow and atmospheric communication, and the controlled atmosphere 18 in the process chamber 16 can be preserved. This type of valve is commercially available from manufacturers such as Everlasting Valve Co., Inc., South Plainfield, NJ. Rather than one valve, a series of valves can be used to perform the functions of the gate valve 24.

Still referring to FIG. 2, the discharge valve 26 can comprise a gravity fed valve operated by an actuator 60 that is controllable by the digital read out device 30 and the central processing unit (CPU) 32. The discharge valve 26 can be selectively placed in an "open" position in which the process chamber 16 and collection chamber 22 are in flow communication of the metal powder 12 and atmospheric communication for gases between the chambers as well. Alternately, the discharge valve 26 can be placed in a "closed" position in which the process chamber 16 is sealed from material flow and atmospheric communication, and the controlled atmosphere 18 in the process chamber 16 can be preserved. Further details of the discharge valve 26 will be described in the description to follow. Another suitable valve is commercially available rotary disc valve for metal powder from a commercial valve manufacturer such as Gemco Valve Company, Middlesex, NJ. In addition, rather than one valve, a series of valves can be used to perform the functions of the discharge valve 26.

Figure 3:
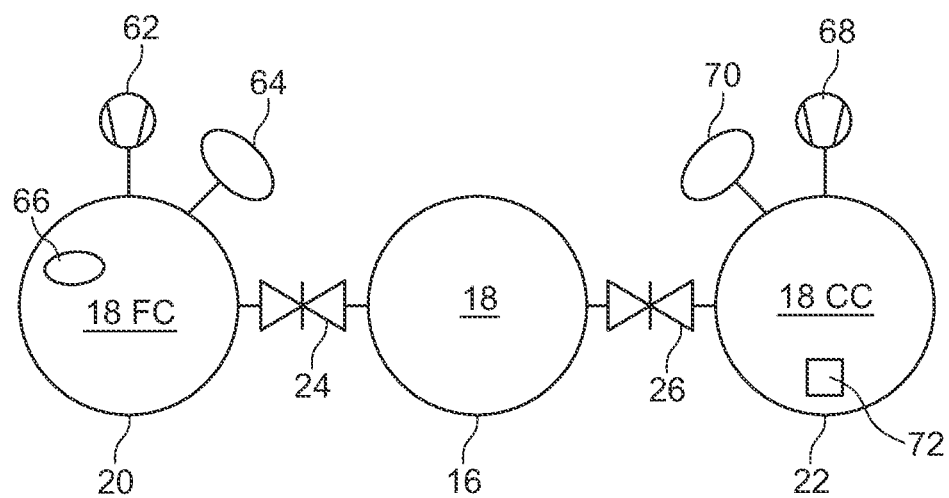
FIG. 3 is a schematic diagram illustrating the process chamber along with atmospherically controlled feed chamber and discharge chamber in flow communication with the process chamber.

Referring to FIG. 3, the feed chamber 20 can comprise a sealed pressure vessel sized to hold a desired quantity of the feed material 14 and having a sealable inlet port (not shown) for loading the feed chamber 20 with the feed material 14 (FIG. 2). The feed chamber 20 can also include a vacuum pump 62 and one or more gas supplies 64 in flow communication with the interior of the feed chamber 20 and controlled by the central processing unit (CPU) 32 (FIG. 2). This atmospheric control capability allows the atmosphere 18FC in the feed chamber 20, including the atmospheric pressure and gas composition, to be controlled to match the controlled atmosphere 18 in the process chamber 16, and to satisfy other process requirements as well. For example, the gas supplies 64 can include reactive gas input to help with removing unwanted surface materials on the feed material 14. The feed chamber 20, as well as the process chamber 18 and the collection chamber 22, can also include various sensors 66 in signal communication with the central processing unit (CPU) 32 (FIG. 2) for providing input for controlling various steps of the process. For example, sensor input can include monitoring O2 and H2O levels in the feed chamber 20. In addition, auto set points for the sensors 66 can be used for opening the gate valve 24 and introducing the feed material 14 into the process chamber 16. The sensors 66 can also include vacuum sensors, pressure sensors, gas sensors (e.g., hydrogen, nitrogen) in signal communication with the central processing unit (CPU) 32 (FIG. 2) to provide input for controlling heat cycles, pump cycles, vacuum pressures and atmospheric pressures in the feed chamber 20, as well as in the collection chamber 22 and the process chamber 16, by the central processing unit (CPU) 32 (FIG. 2).

Still referring to FIG. 3, the collection chamber 22 can comprise a sealed pressure vessel having a vacuum pump 68 and a gas supply 70 in flow communication with the interior of the collection chamber 22 and controlled by the central processing unit (CPU) 32 (FIG. 2). This atmospheric control capability allows the atmosphere 18CC in the collection chamber 22 to be controlled to match the controlled atmosphere 18 in the process chamber 16 or to satisfy other process requirements. In addition, the collection chamber 22 can be configured as a removable vessel for containing a selected quantity of the metal powder 12. Further, the collection chamber 22 can include a weight measuring device 72 for ascertaining the quantity of the metal powder 12 in the collection chamber 22. The weight measuring device 72 can be in signal communication with the central processing unit (CPU) 32 (FIG. 2) which can control other components of the system 10 as a function of the weight.

Referring to FIG. 4, steps in a method for manufacturing a metal powder 12 using a feed material 14 are illustrated. The method includes the step of providing a process chamber 16 having a first controlled atmosphere 18 configured to perform a melting and atomization process, providing a feed chamber 20 in flow communication with the process chamber 16 having controlled atmosphere capabilities configured to store a quantity of the feed material 14 for transport into the process chamber 16, and providing a collection chamber 22 in flow communication with the process chamber 16 having controlled atmosphere capabilities configured to collect the metal powder 12 manufactured in the process chamber 16. The method also includes the step of providing a gate valve 24 between the process chamber 16 and the feed chamber 20 and a discharge valve 26 between the process chamber 16 and the collection chamber 22 configured to selectively seal (close) or unseal (open) the process chamber 16.

The method also includes the steps of forming a second controlled atmosphere 18FC in the feed chamber 20 and forming a third controlled atmosphere 18CC in the collection chamber 22; feeding the feed material 14 from the feed chamber 20 through the gate vale 24 into the process chamber 16; melting the feed material 14 into a molten metal 44 and atomizing the molten metal 44 into the metal powder 12 in the process chamber 16; and discharging the metal powder 12 from the process chamber 16 through the gate valve 24 into the collection chamber 22.

Figure 5:
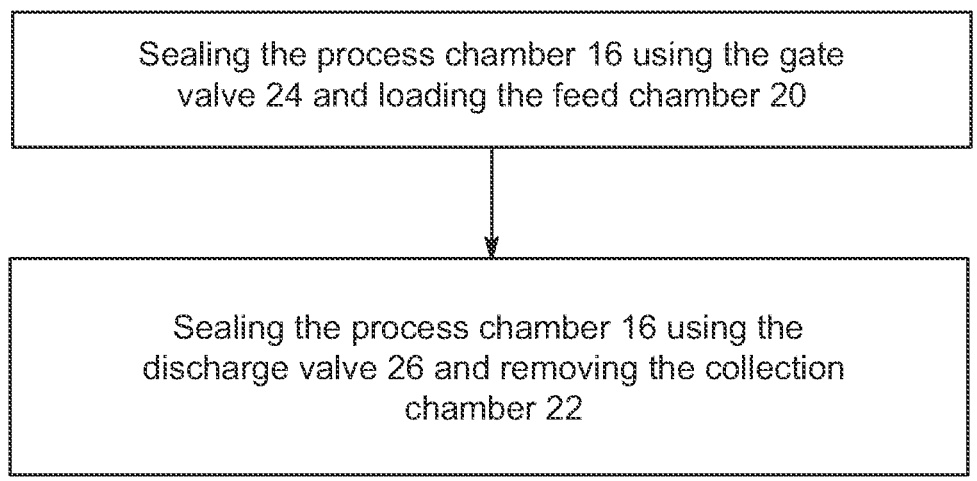
FIG. 5 is a flow diagram illustrating optional additional steps in a method for manufacturing a metal powder using the load lock system.

As shown in FIG. 5, the method can also include the step of sealing the process chamber 16 using the gate valve 24 and loading the feed chamber 20, and the step of sealing the process chamber 16 using the discharge valve 26 and removing the collection chamber 22.

Figure 6A:
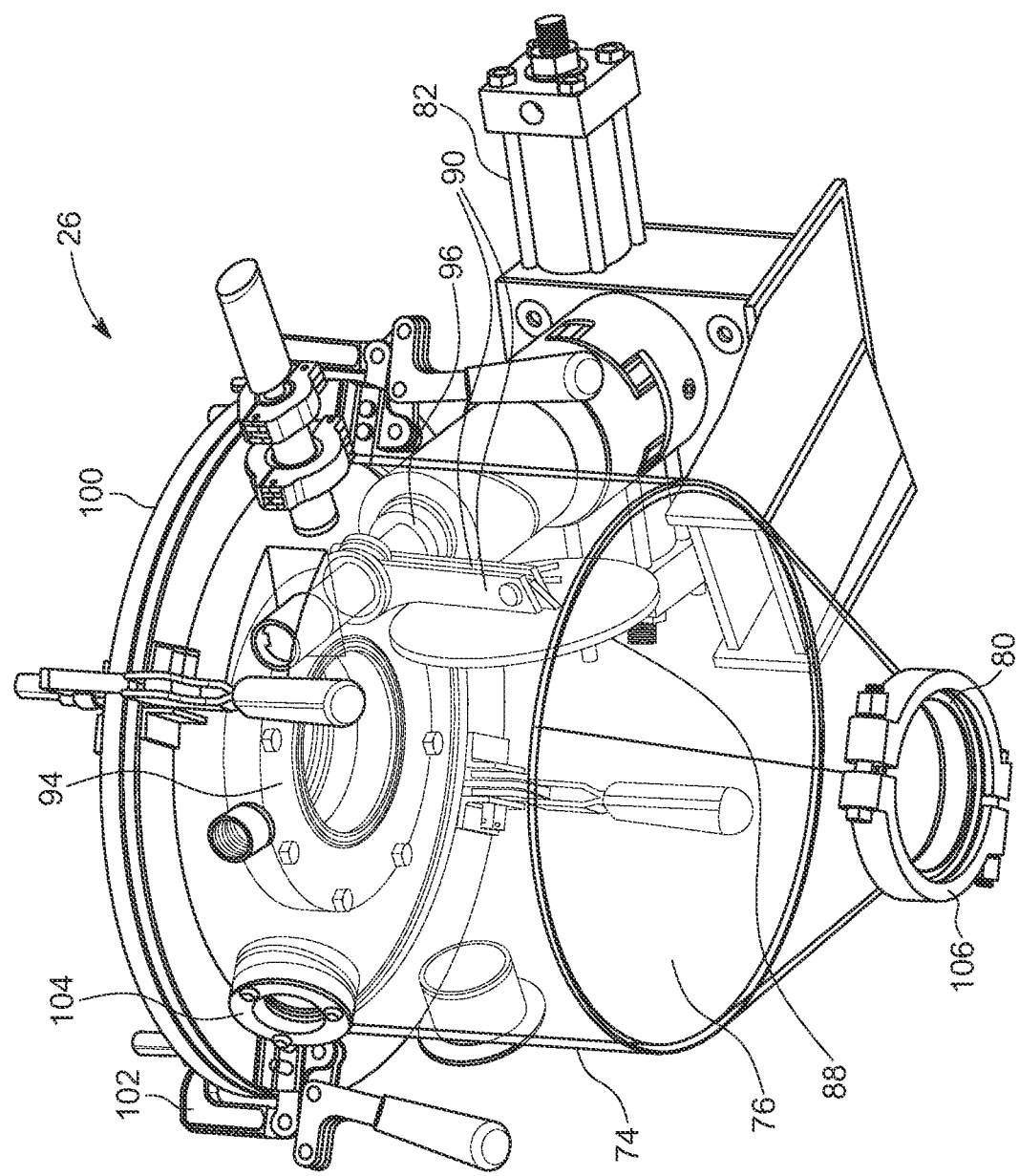
FIG. 6A is a transparent perspective view of a discharge valve for metal powder.
Figure 6B:
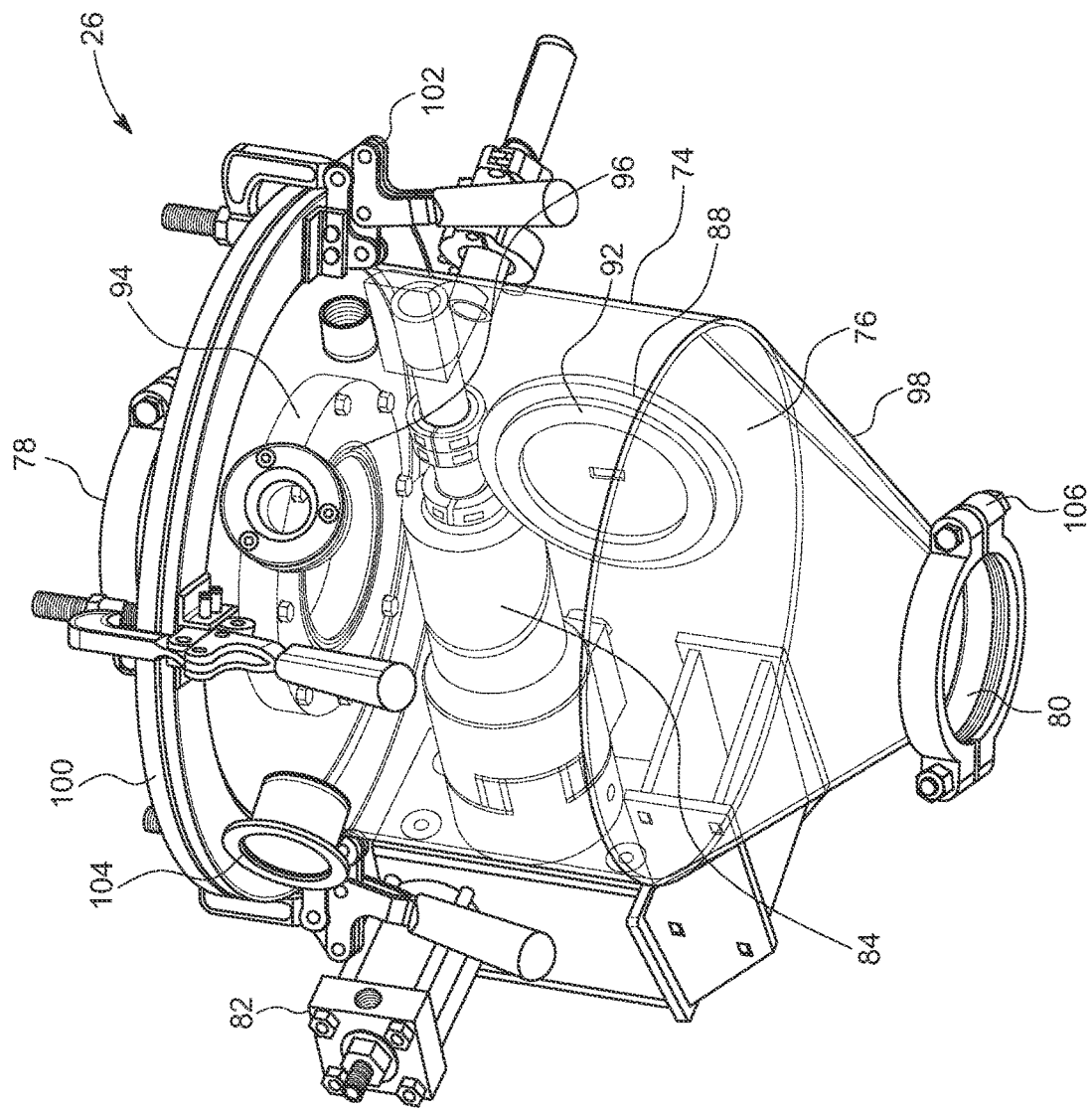
FIG. 6B is another transparent perspective view of the discharge valve shown at a different angle.

Referring to FIG. 6A and FIG. 6B, the discharge valve 26 is shown in greater detail. The discharge valve 26 includes a body 74 which is hollow and generally cylindrical in shape and with a pressure tight interior chamber 76 formed by sidewalls 108 thereof. The body 74 and it's sidewalls 108 can be formed of suitable materials such as a metal, using machining or casting processes known in the art. The body 74 includes an inlet opening 78 in flow communication with the interior chamber 76 for collecting the metal powder 12 formed by the atomization system 56 (FIG. 2). The body 74 also includes an outlet opening 80 in flow communication with the interior chamber 76 for discharging the metal powder 12 (FIG. 2) into the collection chamber 22 (FIG. 1). The body 74 also includes a conical portion 98 (FIG. 6B) configured to funnel the metal powder 12 from the interior chamber 76 through the outlet opening 80 into the collection chamber 22 (FIG. 1). In addition, the collection chamber 22 can comprise a removable tote configured to hold a known quantity of the metal powder 12, that can be easily attached and detached from the discharge valve 26.

Still referring to FIG. 6A and FIG. 6B, the discharge valve 26 also includes a rotary actuator 82 mounted to the outside of the body 74, and having a rotatable shaft 84 (FIG. 6B) placed through a vacuum seal 86 (FIG. 6A) formed in the sidewalls 108 of the body 74 into the interior chamber 76. A circular sealing plate 88 is connected by a pair of metal arms 90 (FIG. 6A) to the rotatable shaft 84 and is movable to either seal (close) the inlet opening 78 or to unseal (open) the inlet opening 78. FIGS. 6A and 6B illustrate the circular sealing plate 88 in an unsealed or open position. Rotation of the circular sealing plate 88 ninety degrees by the rotary actuator 82 moves the circular sealing plate 88 to the sealed (closed) position. The circular sealing plate 88 includes a donut shaped elastomeric sealing ring 92 (FIG. 6B) that mates with an annular serrated surface 96 of a circular sealing flange 94 on the inlet opening 78. The actuator 82 can be operated to rotate the shaft 84 in a first direction (e.g., clockwise) and press the sealing ring 92 against the serrated surface 96 (FIG. 6B) of the sealing flange 94 sealing the inlet opening 78. Alternately, the actuator 82 can be operated to rotate the shaft 84 in a second direction (e.g., counter clockwise) opening the inlet opening 78 and allowing the metal powder 12 to fall by gravity downwards into the interior chamber 76 and through the outlet opening 80 into the collection chamber 22 (FIG. 1). The discharge valve 26 also includes a clamp plate 100 and clamping mechanisms 102 on the body 74 that are removable to allow access to the interior chamber 76. The discharge valve 26 also includes one or more view ports 104 on the body 74 for viewing the interior chamber 76 and an attachment ring 106 on the body 74 circumjacent to the outlet opening 80 for removably attaching the collection chamber 22.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A load lock system for manufacturing a metal alloy using a feed material comprising:
    a process chamber having a controlled atmosphere;
        a metallurgical system in the process chamber configured to perform a metallurgical process to form the metal alloy;
    a feed chamber in flow communication with the process chamber having controlled atmosphere capabilities configured to contain a quantity of the feed material;
    a feed mechanism configured to transport the feed material from the feed chamber into the process chamber;
    a collection chamber in flow communication with the process chamber having controlled atmosphere capabilities configured to collect the metal alloy manufactured in the process chamber by the metallurgical system;
    a gate valve between the process chamber and the feed chamber configured to either allow passage of the feed material from the feed chamber to the process chamber, or to seal the process chamber from the feed chamber;
    a discharge valve between the process chamber and the collection chamber configured to either allow passage of the metal alloy between the process chamber and the collection chamber, or to seal the process chamber from the collection chamber; and
    a first vacuum pump and a first gas supply in flow communication with the feed chamber configured to form a first controlled atmosphere in the feed chamber and a second vacuum pump and a second gas supply in flow communication with the collection chamber configured to form a second controlled atmosphere in the collection chamber.

2. The load lock system of claim 1 wherein the metal alloy comprises a metal powder and the metallurgical system comprises a mixing melting cold hearth system for melting the feed material into a molten metal and an atomization system for atomizing the molten metal into a metal powder.

3. The load lock system of claim 1 further comprising a central processing unit (CPU) in signal communication with the gate valve and the discharge valve having one or more automated programs configured to control the gate valve and the discharge valve and to control the first controlled atmosphere in the feed chamber and the second controlled atmosphere in the collection chamber.

4. A load lock system for manufacturing a metal powder using a feed material comprising:
    a process chamber having a controlled atmosphere;
    a metallurgical system in the process chamber comprising a mixing melting cold hearth system for melting the feed material into a molten metal and an atomization system for atomizing the molten metal into the metal powder;
    a feed chamber in flow communication with the process chamber having controlled atmosphere capabilities configured to contain a quantity of the feed material;
    a feed mechanism configured to transport the feed material from the feed chamber into the process chamber;

a collection chamber in flow communication with the process chamber having controlled atmosphere capabilities configured to collect the metal powder manufactured in the process chamber by the metallurgical system;

a gate valve between the process chamber and the feed chamber configured to either allow passage of the feed material between the feed chamber and the process chamber, or to seal the process chamber from the feed chamber;

a discharge valve between the process chamber and the collection chamber configured to either allow passage of the metal powder between the process chamber and the collection chamber, or to seal the process chamber from the collection chamber; and a first vacuum pump and a first gas supply in flow communication with the feed chamber configured to form a first controlled atmosphere in the feed chamber and a second vacuum pump and a second gas supply in flow communication with the collection chamber configured to form a second controlled atmosphere in the collection chamber.

5. The load lock system of claim 4 wherein the collection vessel comprises a removable vessel for containing a selected quantity of the metal powder.

6. The load lock system of claim 4 wherein the collection chamber includes a weight measuring device for ascertaining a weight of the metal powder in the collection chamber.

7. The load lock system of claim 4 further comprising a central processing unit (CPU) in signal communication with the gate valve and the discharge valve having one or more automated programs configured to control the gate valve and the discharge valve and to control the first controlled atmosphere in the feed chamber and the second controlled atmosphere in the collection chamber.

8. The load lock system of claim 4 wherein the mixing melting cold hearth system comprises a mixing melting cold hearth and an external heat source.

9. The load lock system of claim 4 wherein the feed mechanism comprises a component selected from the group consisting of hydraulic cylinders, pneumatic cylinders, actuators, belt chains, tracks, conveyors, and motive devices.

10. A load lock system for manufacturing a metal powder using a feed material comprising:

a process chamber having a controlled atmosphere;

a metallurgical system in the process chamber comprising a mixing melting cold hearth system for melting the feed material into a molten metal and an atomization system for atomizing the molten metal into the metal powder;

a feed chamber in flow communication with the process chamber having controlled atmosphere capabilities configured to contain a quantity of the feed material;

a feed mechanism configured to transport the feed material from the feed chamber into the process chamber;

a collection chamber in flow communication with the process chamber having controlled atmosphere capabilities configured to collect the metal powder manufactured in the process chamber by the metallurgical system;

a gate valve between the process chamber and the feed chamber configured to either allow passage of the feed material between the feed chamber and the process chamber, or to seal the process chamber from the feed chamber; and a discharge valve between the process chamber and the collection chamber configured to either allow passage of the metal powder between the process chamber and the collection chamber, or to seal the process chamber from the collection chamber, the discharge valve comprising:

a body having an interior chamber in flow communication an inlet opening on the body for collecting the metal powder and an outlet opening on the body for discharging the metal powder into the collection chamber;

a rotary actuator mounted to the outside of the body and connected to a rotatable shaft mounted through a vacuum seal into the interior chamber; and a sealing plate connected to the rotatable shaft and movable to either seal or close the inlet opening or to unseal or open the inlet opening, the sealing plate having an elastomeric sealing ring that mates with a sealing flange on the inlet opening;

the actuator configured to rotate the shaft in a first direction and press the sealing ring against the sealing flange sealing the inlet opening, the actuator configured to rotate the shaft in a second direction opening the inlet opening and allowing the metal powder to fall from the inlet opening through the interior chamber to the outlet opening.

\* \* \* \* \*